United States Patent
Walding

[19]

[11] Patent Number: 5,853,030
[45] Date of Patent: Dec. 29, 1998

[54] PIPE COUPLING WITH A DISINFECTANT INJECTION PORT

[76] Inventor: Larry Walding, 818 Bassett Rd., Palestine, Tex. 75801

[21] Appl. No.: 820,373

[22] Filed: Mar. 11, 1997

[51] Int. Cl.[6] .................................................. F16L 55/16
[52] U.S. Cl. ........................... 138/99; 138/103; 138/155; 285/112; 285/367; 285/177
[58] Field of Search ............................. 138/99, 103, 156, 138/155; 285/197, 112, 373, 126.1, 133.11

[56] References Cited

U.S. PATENT DOCUMENTS

| | | | |
|---|---|---|---|
| 142,388 | 9/1873 | Goble | 285/398 |
| 1,052,198 | 2/1913 | Wyre | 285/399 |
| 1,162,595 | 9/1915 | Forgey | 285/199 |
| 2,778,662 | 1/1957 | Smith | 285/343 |
| 3,078,108 | 2/1963 | Smith | 285/104 |
| 3,533,650 | 10/1970 | Smith | 285/197 |
| 3,790,194 | 2/1974 | Kimberley | 285/373 |
| 4,015,634 | 4/1977 | Christie | 138/99 |
| 4,043,333 | 8/1977 | Munsch | 285/197 X |
| 4,273,364 | 6/1981 | de Lange | 285/197 |
| 4,391,458 | 7/1983 | Blakeley | 285/112 |
| 4,408,788 | 10/1983 | Beukema | 285/419 |
| 4,652,023 | 3/1987 | Timmons | 285/93 |
| 4,653,782 | 3/1987 | Munday | 285/373 |
| 4,768,813 | 9/1988 | Timmons | 285/373 |
| 4,789,189 | 12/1988 | Robertson | 285/197 |
| 4,948,293 | 8/1990 | Smith | 405/36 |
| 4,949,744 | 8/1990 | Heed et al. | 285/197 X |
| 5,040,828 | 8/1991 | Kane | 285/197 |
| 5,066,053 | 11/1991 | Miller | 285/373 |
| 5,104,150 | 4/1992 | Bard et al. | 285/133.11 X |
| 5,358,286 | 10/1994 | Eaton et al. | 285/197 |
| 5,375,888 | 12/1994 | Ikeda | 285/15 |
| 5,584,808 | 12/1996 | Healy | 604/86 |
| 5,590,913 | 1/1997 | Morris et al. | 285/18 |

*Primary Examiner*—Patrick F. Brinson
*Attorney, Agent, or Firm*—Jack D. Stone, Jr.

[57] ABSTRACT

A pipe coupling includes first and second coupling shells, each of which shells define a semicircular cross-section, and first and second longitudinal flanges, and wherein the shells are hingedly coupled together about the respective first longitudinal flanges. Fasteners secure together the second longitudinal flanges to enclose two longitudinally-spaced sections of pipe with a generally cylindrical housing. The first coupling shell further defines a port extending radially therefrom into which a grommet is preferably disposed. The grommet defines a normally-closed aperture for passing a needle therethrough for injecting a chemical, such as a disinfectant, into fluid, such as water, in the pipe.

10 Claims, 3 Drawing Sheets

PIPE COUPLING WITH A DISINFECTANT INJECTION PORT

BACKGROUND OF THE INVENTION

The invention relates generally to pipe couplings and, more particularly, to pipe couplings having disinfectant injection ports.

It is common practice for a pipe that carries fluid, such as water, to be buried underground and to then be periodically excavated to repair a hole that develops in the pipe, through which hole fluid leak. To repair such a hole, either the hole is drilled out and plugged or, more typically, the section of pipe having the hole is removed and replaced with a new section of pipe. During the course of the repairs, the interior of the pipe is exposed to the environment and may become contaminated with dirt, bacteria, and other contaminates. When the pipe is then placed back in service, fluid in the pipe is contaminated. If the contaminated fluid is water to be used for human consumption, then the water must be disinfected. It is becoming more important, as increasingly stringent health environmental regulations are enacted, that such water must be disinfected.

Conventionally, water in a pipe is disinfected by pouring a disinfectant, such as chlorine or a chlorine-based solution, into the upstream end of the pipe at the point of repairs, and then closing up the pipe with the disinfectant disposed therein. A practical drawback with such a procedure, though, is that it is difficult to close the pipe back together before some or most of the disinfectant escapes from the pipe onto the ground. Disinfectants that do not remain in the pipe not only fail to achieve the purpose for which they were intended, but also constitute unnecessary waste, and possibly also pollute the region of ground into which the disinfectant enters.

The foregoing problems have been mitigated in some cases where there is an upstream point in the pipe into which disinfectants may be injected into the stream of water flowing through the pipe and thereby carried in the flow to the point of contamination. Such an injection point is often on the order of one or more miles upstream of the contamination point. While traveling to the point of contamination, the disinfectant is dispersed and partially neutralized, resulting in a loss of effectiveness. To compensate for such loss of effectiveness, greater quantities of chemical must be injected than is necessary at the contamination point, resulting in increased costs and, in many cases, in poor tasting water.

What is needed, then, is a device or method for disinfecting water in a pipe after the water has been contaminated during the course of repairs on the pipe.

SUMMARY OF THE INVENTION

The present invention, accordingly, provides for fluid in a pipe to be disinfected after the pipe has been opened for repairs. To this end, a pipe coupling has first and second coupling shells, each of which shells define a semicircular cross-section and first and second longitudinal flanges, the shells being hingedly coupled together about the respective first longitudinal flanges. Fasteners secure together the second longitudinal flanges to enclose two longitudinally-spaced sections of pipe with a generally cylindrical housing. The first coupling shell further defines a port extending radially therefrom, the port being configured for receiving a grommet having a normally closed aperture penetrable by a needle for injecting a chemical, such as a disinfectant, into fluid, such as water, in the pipe.

An advantage achieved with the present invention is that disinfectants may be injected into a pipe where it has been opened and repaired without losing any disinfectant from the pipe onto the ground.

Another advantage achieved with the present invention is that only the amount of disinfectant that is needed at the point of repair must be injected into the pipe, thereby obviating the need for introducing greater quantities of disinfectant upstream of the point of repair, and reducing the risk that drinking water delivered through the pipe will be distasteful.

As a result of the foregoing, another advantage achieved with the present invention is that disinfectant is not wasted and a significant cost-savings is achieved.

Another advantage achieved with the present invention is that the coupling can be readily assembled onto a pipe in a field location without any special tools.

Another advantage achieved with the present invention is that structural support is provided to the pipe portions coupled together.

BRIEF DESCRIPTION OR THE DRAWINGS

DETAILED DESCRIPTION OF THE PREFERRED EMBODIMENT

Figure 1:
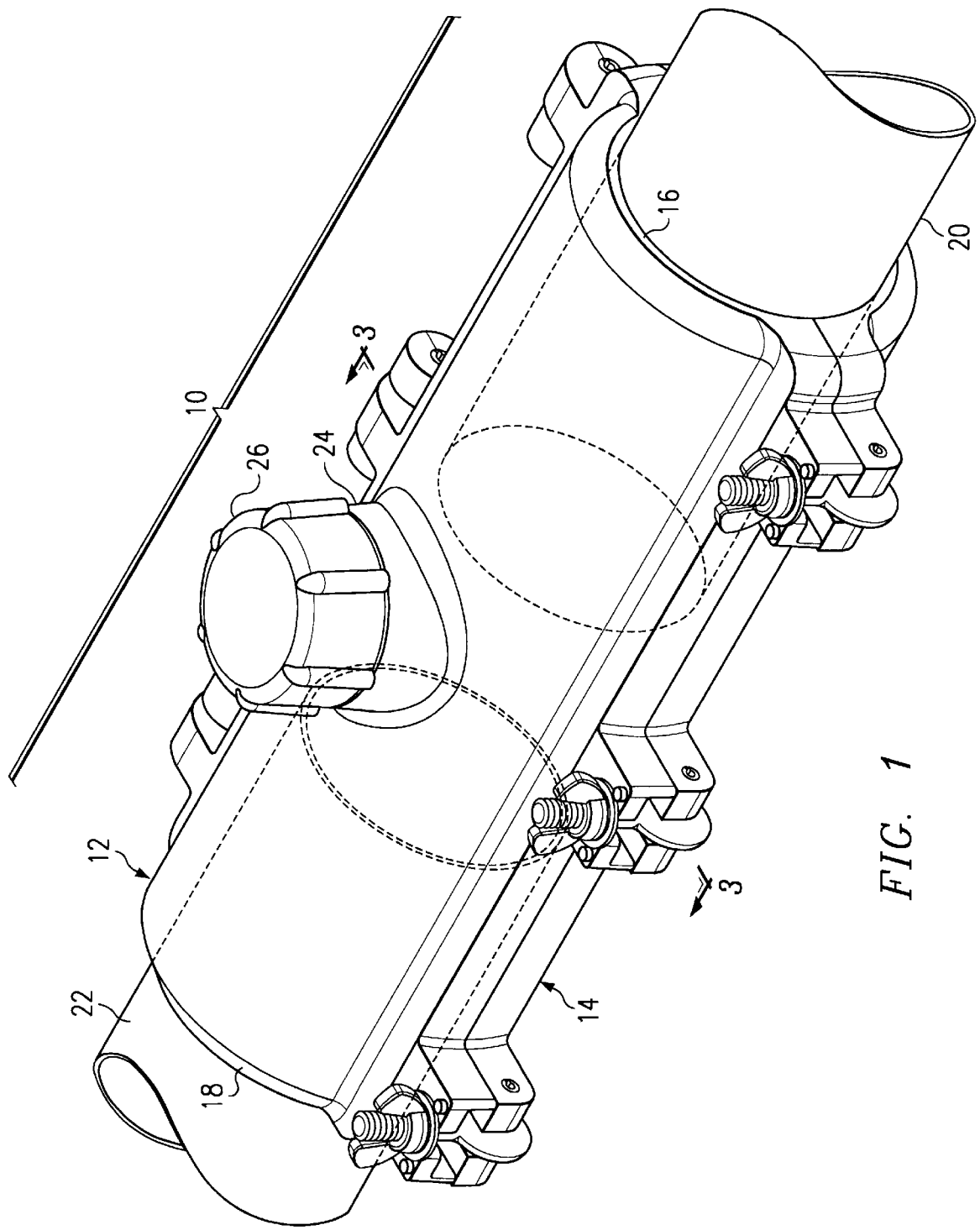
FIG. 1 is a perspective view of a coupling embodying features of the present invention and secured about a pipe.
Figure 2:
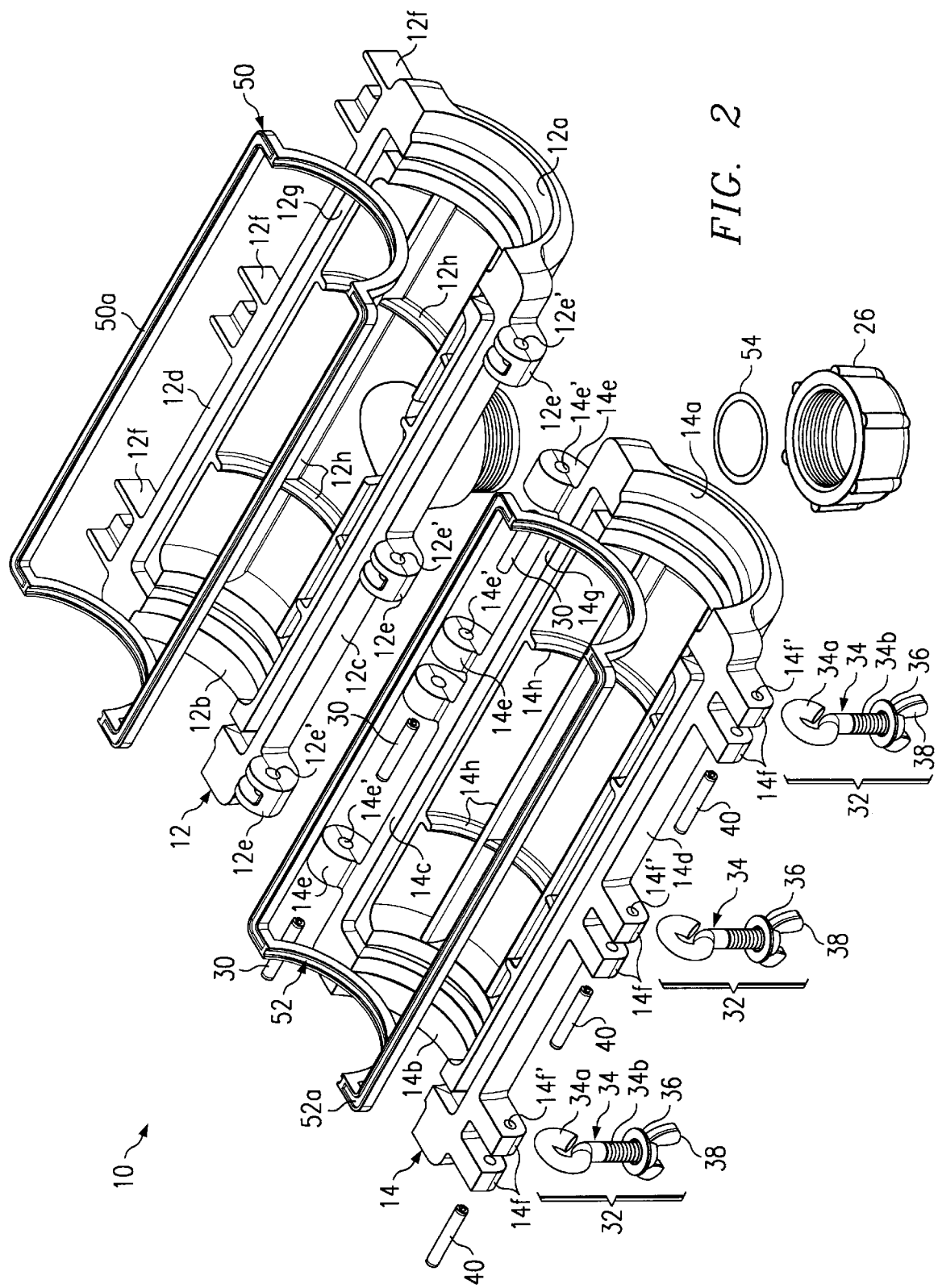
FIG. 2 is an exploded view of the coupling of FIG. 1.

Referring to FIGS. 1 and 2, the reference numeral 10 designates, in general, a coupling embodying features of the present invention for assembly onto a pipe. As viewed in FIG. 1, the coupling 10 includes complementary semicircular upper and lower coupling shells 12 and 14, respectively, which, when coupled together as described below, form a generally cylindrically-shaped hollow coupling with first and second open ends 16 and 18, respectively, configured for receiving upstream and downstream pipe portions 20 and 22, respectively. The coupling 10 further includes a port 24 extending radially upwardly from the coupling for providing fluid communication from the exterior to the interior of the coupling. A cap 26 having female threads (not shown) is threadingly secured to corresponding male threads (not shown) on the port 24 for sealing the port. The coupling 10 is preferably fabricated from material similar to the material from which the pipe portions 20 and 22 are fabricated; poly vinyl chloride (PVC), for example, is preferred for coupling pipe portions of like material.

Referring to FIG. 2, the upper coupling shell 12 includes first and second semicircular end portions 12a and 12b, respectively, and upper and lower longitudinally-extending flange portions 12c and 12d, respectively. Similarly, the lower coupling shell 14 includes first and second semicircular end portions 14a and 14b, respectively, and upper and lower longitudinally-extending flange portions 14c and 14d, respectively. It can be appreciated that the end portions 12a and 12b define the first open end 16, and that the end portions 14a and 14b define the second open end 18.

The upper and lower first flange portions 12c and 14c, respectively, include corresponding mating upper and lower hinge portions 12e and 14e, respectively, which define respective longitudinally-extending holes 12e' and 14e' configured for receiving slotted spring pins 30 to thereby rotatably couple together the first and second coupling shells 12 and 14.

The upper and lower second flange portions 12d and 14d, respectively, include corresponding mating upper and lower slotted portions 12f and 14f, respectively, extending outwardly therefrom. The slotted portions 14f are configured for receiving fastener shanks 32, each of which shanks includes closed eye bolt pins 34 having eyes 34a opposite straight portions 34b, washers 36, and wing nuts 38. The slotted portions 14f additionally define longitudinal holes 14f' for receiving slotted spring pins 40 extending through the eyes 34a of the shanks 32 for rotatably securing the shanks in respective slotted portions 14f. As most clearly shown in FIG. 1, the slotted portions 12f are configured for receiving the straight portions 34b of the shanks 32 when the two coupling shells 12 and 14 are assembled together so that, by tightening the wingnuts 38, the two coupling shells may be secured together.

The upper coupling shell 12 further defines a groove 12g which extends continuously along the upper first longitudinal flange 12c, the semi-circular end portions 12a and 12b, and along the upper second longitudinal flange 12d. Similarly, the lower coupling shell 14 further defines a groove 14g which extends continuously along the lower first longitudinal flange 14c, the semi-circular end portions 14a and 14b, and along the lower second longitudinal flange 14d. Upper and gaskets 50 and 52, respectively, fabricated from a pliable material such as rubber, are seated in the grooves 12g and 14g, respectively, and are bonded therein with an adhesive such as epoxy (not shown). The upper gasket 50 is provided with a tongue 50a, and the lower gasket 52 is provided with a groove 52a which is sized for matingly receiving the tongue 50a when the coupling 10 is assembled together to thereby form a tongue and groove interface which provides a seal between the open ends 16, 18 and the pipe portions 20, 22, and between the coupling shells 12 and 14. The shells 12 and 14 additionally include respective internal bracing ribs 12h and 14h for providing structural integrity to the shell portions and to the pipe portions 20 and 22 secured thereto.

Figure 3:
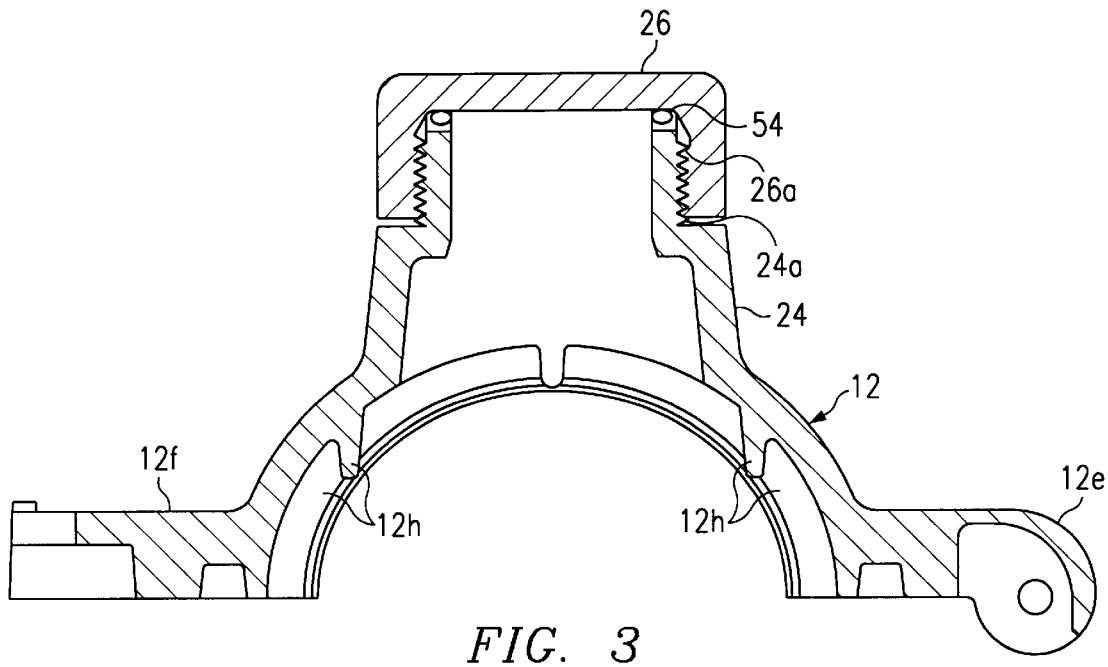
FIG. 3 is a cross-section of an upper coupling shell taken along the line 3—3 of FIG. 1.

As depicted in FIG. 3, the port 24 extending radially outwardly from the upper coupling shell portion 12 includes male threads 24a configured for matingly engaging female threads 26a on the cap 26. An O-ring gasket 54 is interposed between the port 24 and the cap 26 for securely sealing off the port and preventing the flow of fluid and contaminants therethrough.

In operation, water pressure to a pipe having a hole (not shown) in it is shut off and the pipe is excavated for repair. The section of pipe having the hole is then preferably removed, leaving the upstream and downstream pipe portions 20 and 22, respectively, as shown in FIG. 1. Depending on the particular hole, the hole could alternatively be left as it is, or drilled out to provide for a smooth bore extending through the wall of the pipe. The disconnected pipe portions 20 and 22 are then aligned relative to the other as they should be positioned in the ground. The coupling 10 is then rotatably opened about the hinged flanges 12c and 14c, and is positioned over the pipe between the upstream and downstream portions 20 and 22. Once so positioned, the coupling 10 is manually closed over the pipe, the straight portions 34b of the shanks 32 are positioned in the upper slotted portions 12f, and the wingnuts 36 are tightened so that the coupling 10 is secured over the pipe portions 20 and 22, and the pipe portions sealed via the tongue and groove seals 50 and 52. With the cap 26 removed from the port 24, a disinfectant, such as chlorine or a chlorine-based solution or any disinfecting solution that could be mixed with human drinking water, is poured via the port into the coupling, and hence into the pipe portions for disinfecting water in the pipe. The cap 26 and O-ring 54 are secured to the port 24 to seal off the port, thereby preventing the disinfectant from escaping from the pipe through the port, as well as preventing the entry of contaminants through the port into the pipe. Once the pipe portions 20 and 22 are coupled together via the coupling 10, the pipe is "pressured up" and normal operation of the pipe is resumed.

Figure 4:
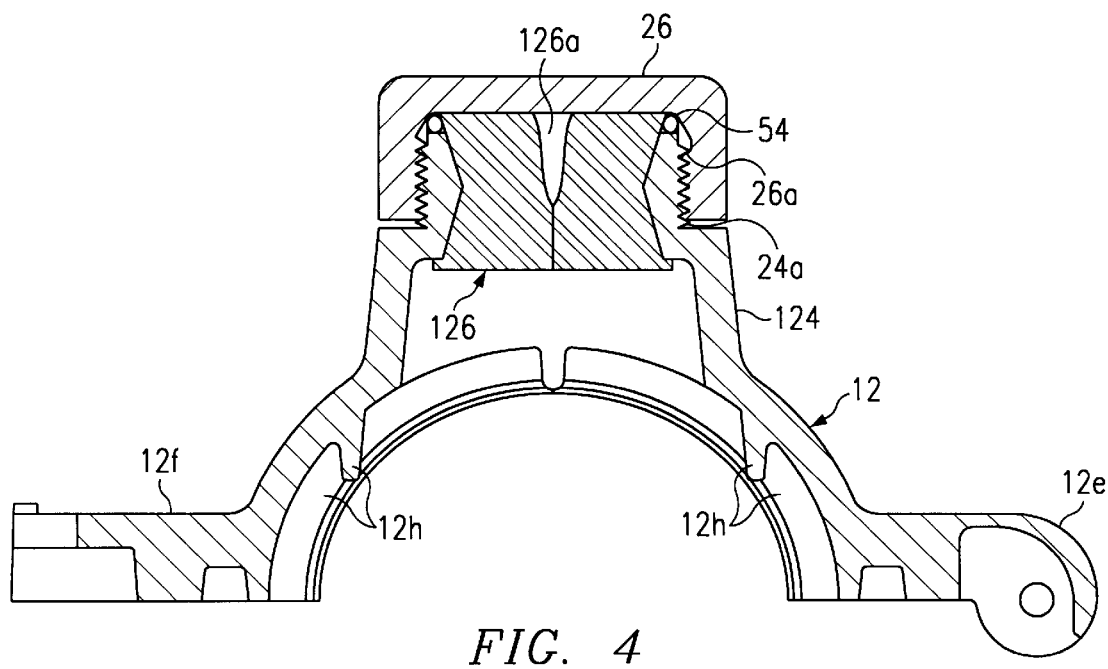
FIG. 4 is a cross-section of an upper coupling shell embodying features of an alternate embodiment of the present invention.

In an alternate embodiment of the present invention, the coupling 10 is identical to that shown in FIGS. 1 and 2, but for the port 24, which, in the alternate embodiment, is given the reference numeral 124, and is shown in cross-section in FIG. 4. The port 124 is configured for receiving and conforming to the shape of an hour-glass-shaped grommet 126 fabricated from a pliable material such as rubber. It can be appreciated that due to the hour-glass shape of the grommet 126 and the conformity of the port 124 thereto, the grommet is secured therein. The grommet 126 defines an aperture 126a centrally formed therethrough, the lower portion of which aperture is normally closed, but through which a needle (not shown) may pass for injecting disinfectant through the coupling 10 into a stream of water flowing through the pipe portions 20 and 22. Since the aperture 126a is normally closed, fluid in the coupling 10 and in the pipe portions 20, 22 cannot escape through the aperture into the environment, and contaminants cannot enter into the coupling and water flowing therethrough. While the placement of the grommet 126 in the port 124 alleviates the need for the cap 26 and the O-ring 54, it is preferable that the cap and O-ring be maintained on the port to more securely seal the port, particularly if the coupling 10 is to be buried underground.

Operation of the alternate embodiment of the coupling 10 is identical to the operation of the previous embodiment of the coupling 10, except that a needle must be passed through the aperture 126a for injecting disinfectant through the coupling 10 into water in the pipe portions 20 and 22.

The present invention has several advantages. For example, disinfectant may be injected into a pipe where it has been repaired without losing any disinfectant from the pipe onto the ground. Furthermore, only the quantity of disinfectant that is needed at the point of repair must be injected into the pipe, thereby obviating the need for introducing greater quantities of disinfectant upstream of the repair to disinfect water in the pipe, and reducing the risk that drinking water delivered through the pipe will be rendered distasteful. Additionally, for the foregoing reasons, fluid is not wasted and a significant cost-savings is achieved. Still further, the coupling 10 may be assembled onto a pipe in a field location without any special tools. The present invention also provides structural support to the pipe portions coupled together.

It is understood that the present invention can take many forms and embodiments. The embodiments described herein are intended to illustrate rather than to limit the invention. Accordingly, several variations may be made in the foregoing without departing from the spirit or the scope of the invention. For example, a valve such as a gate valve, butterfly valve, or ball valve may be attached to the port 24 or 124 and/or to the upstream pipe portion 20 for controlling pressure in the pipe as disinfectant is injected therein. The ports 24 and 124 may be used for injecting into a stream of fluid flowing through the pipe any chemical or fluid that may be desired, whether or not such chemical or fluid is a disinfectant. The gaskets 50 and 52 may be replaced or supplemented with sheets sized for being wrapped around the pipe portions 20 and 22 and secured thereto by the coupling 10. The upper and lower coupling shells 12 and 14 may be hingedly coupled together using techniques other than that described in the foregoing, such as a conventional "piano" hinge, or by integrally forming the two shells as single shell which is sufficiently flexible to be opened and positioned about the pipe. Other types of fasteners, such as bolts and nuts, or steel bands wrapped around the coupling may be used to secure the shells 12 and 14 together when assembled on the pipe sections. The internal bracing ribs 12h and 14h may be provided with orifices so that, for example, in cases where a hole in a pipe is drilled out instead of a section of the pipe removed, and the hole in the pipe is not aligned with the port 24, 124, fluid which is injected through the port may pass between the pipe and the coupling 24, 124 through the orifices to the hole in the pipe.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A pipe coupling comprising:
    a first coupling shell configured to matingly engage a first semi-circular section of at least one pipe;
    a second coupling shell configured to matingly engage a second semi-circular section of the at least one pipe;
    a hinge rotatably connecting the first and second coupling shells;
    at least one fastener coupled to the first coupling shell and adapted to maintain the first and second coupling shells in engagement with the at least one pipe, thereby forming the pipe coupling;
    a port extending through the first coupling shell for providing fluid communication between the exterior and the interior of the pipe coupling;
    a grommet disposed in the port for preventing fluid from escaping from the coupling, wherein the grommet comprises a pliable material through which an aperture is defined having an open portion and a normally-closed portion, which pliable material is adapted to radially compress and expand to permit the normally-closed portion to radially expand and open upon penetration by a needle for the injection of fluid therethrough into the coupling, and to radially contract and close upon removal of the needle; and
    a cap for placement on the port for preventing fluid communication through the port.

2. A pipe coupling comprising:
    a first coupling shell configured to matingly engage a first semi-circular section of at least one pipe;
    a second coupling shell configured to matingly engage a second semi-circular section of the at least one pipe;
    a hinge rotatably connecting the first and second coupling shells;
    at least one fastener coupled to the first coupling shell and adapted to maintain the first and second coupling shells in engagement with the at least one pipe, thereby forming the pipe coupling;
    a port extending through the first coupling shell for providing fluid communication between the exterior and the interior of the pipe coupling, wherein the port defines an hour-glass shaped interior, and fluid is a disinfectant for disinfecting water in the at least one pipe, and wherein the port defines male threads formed thereon and the coupling further comprises a cap defining female threads for threadingly engaging and sealing the port; and
    a grommet disposed in the port for preventing fluid from escaping from the coupling, the grommet defining an hour-glass shaped exterior configured to conform to and sealingly fit into the hour-glass shaped interior of the port, wherein the grommet comprises a pliable material through which an aperture is defined having a normally-open portion and a normally-closed portion, which pliable material is adapted to radially compress and expand to permit the normally-closed portion to radially expand and open for sealing penetration by a needle for the injection of fluid therethrough into the coupling and the at least one pipe, and to radially contract and sealingly close during, and subsequent to, removal of the needle.

3. A pipe coupling comprising:
    a first coupling shell configured to matingly engage a first semi-circular section of at least one pipe;
    a second coupling shell configured to matingly engage a second semi-circular section of the at least one pipe;
    at least one fastener coupled to the first coupling shell and adapted to maintain the first and second coupling shells in engagement with the at least one pipe, thereby forming the pipe coupling;
    a port extending through the first coupling shell for providing fluid communication between the exterior and the interior of the pipe coupling a cap for placement on the port for sealing the port; and
    a grommet disposed in the port for preventing fluid from escaping from the coupling, wherein the grommet comprises a pliable material through which a normally-closed aperture is defined which pliable material is adapted to radially compress and expand to permit the normally-closed aperture to radially expand and open upon penetration by a needle, and to radially contract and close upon removal of the needle.

4. The coupling of claim 3 wherein the port defines male threads and the cap defines female threads for matingly engaging the port.

5. The coupling of claim 3 wherein the fluid is a disinfectant for disinfecting water in the pipe.

6. The coupling of claim 1 wherein the at least one pipe is two pipes, the first semi-circular section of at least one pipe is first semi-circular sections of two pipes, and the second semi-circular section of at least one pipe is second semi-circular sections of two pipes.

7. The coupling of claim 1 wherein the fluid is a disinfectant for disinfecting water in the pipe.

8. The coupling of claim 2 wherein the at least one pipe is two pipes, the first semi-circular section of at least one pipe is first semi-circular sections of two pipes, and the second semi-circular section of at least one pipe is second semi-circular sections of two pipes.

9. The coupling of claim 3 wherein the at least one pipe is two pipes, the first semi-circular section of at least one pipe is first semi-circular sections of two pipes, and the second semi-circular section of at least one pipe is second semi-circular sections of two pipes.

10. The coupling of claim 3 wherein the at least one fastener further comprises a hinge rotatably connecting the first and second coupling shells.

* * * * *